Figure 1:
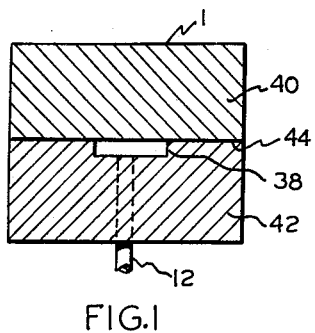

Nov. 30, 1965   J. WEICHBROD   3,220,256
LINEAR FLOW METER
Filed Sept. 12, 1962

INVENTOR.
JOSEPH WEICHBROD
BY
*Fidelman & Wolffe*
ATTORNEYS

United States Patent Office 3,220,256
Patented Nov. 30, 1965

3,220,256
LINEAR FLOW METER
Joseph Weichbrod, Silver Spring, Md., assignor to National Instruments Laboratories, Inc., Rockville, Md., a corporation of Maryland
Filed Sept. 12, 1962, Ser. No. 223,098
4 Claims. (Cl. 73—205)

This application is a continuation-in-part of Serial No. 824,423, filed July 1, 1959, now Patent No. 3,071,160 issued January 1, 1963, which in turn is a continuation-in-part of Serial No. 345,991, filed March 31, 1953, now abandoned.

This invention relates to the measurement of the rate of flow (or viscosity) of a fluid, whether gaseous or liquid, and more particularly to an improved linear flow meter.

The advantages of the linear type flow meter over those which operate on the Bernoulli principle (i.e., fixed orifices, nozzles, venturi tubes, variable orifices, etc.) are well known to those skilled in the art. However, all of the linear type flow meters heretofore known to me are characterized by disadvantages, including inaccuracies, some of which will be specifically referred to as the accompanying description proceeds.

It is among the objects of the present invention to provide a linear flow meter which is characterized by results which are accurate to an extent hitherto unknown.

Another object of the present invention is the provision of an extremely accurate device of the class described which is relatively simple and inexenpsive to manufacture.

Another object is to provide a fluid flow meter whose readings are essentially a linearly function of volume flow rate independent of pressure.

Still another object is the provision of a fluid flow meter possessing a higher degree of linearity of pressure drop with volume flow rate than can be obtained when using other types of linear flow meters (such as the well-known porous plug type) for the same volume.

A further object is to provide a fluid flow meter which is characterized by the aforementioned objectives and which is also easy to protect form clogging by filtration, easy to clean by washing, and possessed of strength and rigidity.

A still further object is to measure the linear flow of a fluid which includes passing the fluid, whether gaseous or liquid, through one or more parallel rectangular shaped slots or flow restricting channels occupying a small space and measuring the pressure drop across a portion of the length of the said slots, whereby extremely accurate results are obtained.

Thus, the teachings of the present invention contemplate readings which are primarily a linear function of the viscosity of the fluid and of the volume flow rate, as distinguished from flow meters of the orifice or venturi types wherein the reading is proportional to the product of the density and the square of the volume flow rate.

Importantly, the present invention contemplates employment of a specific structure for the elemental flow channel of the linear flow meter. The elemental flow channel is an unimpeded passageway of a substantially uniform depth in the range of 0.002 to 0.100 inch and of a width at least ten times the depth. Theoretically and in practice, such a channel results in a substantial improvement in flow restrictor efficiency over prior art structures.

The following description and the annexed drawings set forth in detail certain illustrative embodiments of the invention, these being indicative of but several ways in which the principles underlying the invention may be employed. Other ways are shown in copending application Serial No. 345,991, filed July 1, 1959 of which this case is a continuation-in-part.

Figure 2:
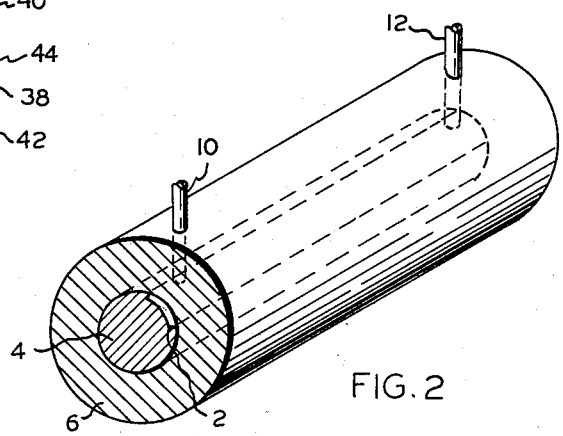
Figure 3:
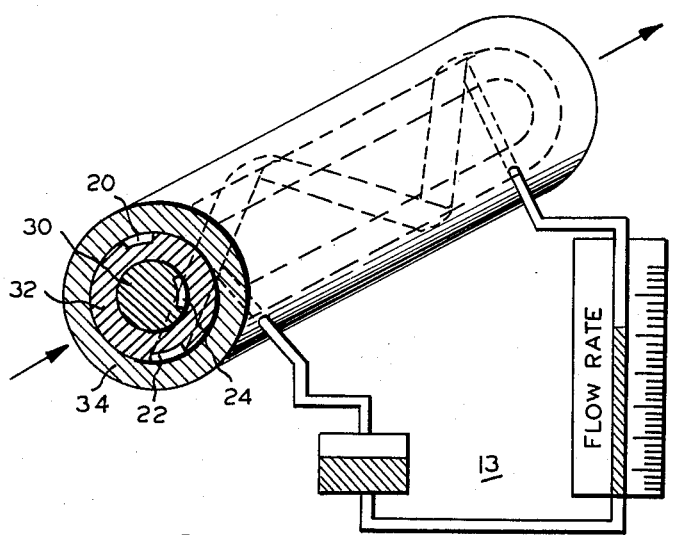

In said drawings:
FIGURE 1 is a cross-sectional view of a flow meter constructed in accordance with the teachings of the present invention;
FIGURE 2 is a diagrammatic view of a modified form of flow meter; and,
FIGURE 3 is a diagrammatic view of still another modified form of flow meter.

The flow meter of the present invention which is adapted principally for low fluid flow rates has been based on a fluid restrictor containing a single slot or channel. The structure of the fluid restrictor involves an enlongated flow element with a fluid entranceway and a fluid exit passage at the ends, pressure taps positioned on the flow element intermediate the ends thereof, and solid fluid imperforate material intermediate the pressure taps. A small number, often only one, substantially uimpeded fluid flow channel extend through the imperforate material. Since all flow through the fluid restrictor must traverse the channel or channels at laminar flow rates, connection of the taps thereto allows for direct measurement of the flow rate. Employment of a rectangular shaped channel in the fluid restrictor makes for a flow meter with a high degree of lineraity over the intended range of the flow meter.

For very low fluid flow rates the single slot mode illustrated in FIGURE 1 has been found practical. One channel or slot 38, rectangular in cross-section and from 0.002–0.100 inch deep, is formed between plates 40, 42 and suitable tap holes are drilled near the ends of slot 38 for connection to taps 12, one of which is shown in FIGURE 1, and then to an indicating instrument (not shown.) Desirably the shallow elongated slot 38 is milled entirely out of one plate as illustrated for plate 42, by standard techniques like machining, chemical milling, etc., and the other plate 40 left smooth, the contacting plate surfaces 44 being, however, machined to provide a close fit. The paired plates 40, 42 which are assembled by gasketing, brazing, solder, etc., need not be provided with a separate external housing other than what may be necessary to connect each end of slot 38 with the flowing fluid being measured. This single slot mode is particularly adapted for accurately measuring flow rates of the order of 10 cc. per minute.

FIGURE 2 illustrates another construction of the single slot configuration wherein the slot 2 is formed by milling or otherwise forming a slot either on the outer surface of a cylinder 4 as shown in FIGURE 2 or on the inside of tube 6. The tube 6 and cylinder 4 are then assembled into a tightly interfitted unit, e.g., by shrink fit techniques. This cylindrical mode has an advantage over the mode of FIGURE 1 in that its construction makes for a more facile avoidance of leakage problems.

It should be noted that the two taps 10, 12, both of which are shown in FIGURE 2, are illustrated as having been placed well within the terminal ends of the slot 2 in accordance with preferred practice of the present invention.

FIGURE 3 shows still another variation of the single slot configuration in a mode where several optional structural variations have been combined into a device illustrative of practice of this invention. The first variation is the expedient of spiralling the single slot 22 around the periphery of tubular member 32 so as to greatly increase the effective length of the linear flow path provided by slot 22 in a given running length of tube 32. This construction is particularly advantageous where the gas flow being measured is in extremely low volumes such as 1 cc. per minute.

Second feature present in the mode of FIGURE 3, and one not limited to the spiral channel shown in FIGURE 3, is provision of multiple flow paths by adding additional slots 20, 24. Thus, several slots (all spiralled or all straight) may be placed between tubes 32, 34 as shown by slots 20, 22; also, or alternatively a smaller slotted cylinder 30 may be fitted inside inner tube 32 to provide one or more additional slots like 24. In the mode of FIGURE 3 the multiple slots are all spiralled, but they may be made linear in the manner of the FIGURE 2 construction. In a similar manner more than one straight slot may be used in the construction shown by FIGURE 1.

While the individual slot construction of the present invention is expressly intended for low flow rates, instances do exist where the flow to be measured is too great for one slot, but not sufficient for employment of the flow meter structures shown in the copending application S.N. 824,423, filed July 1, 1959, now Patent 3,071,160 of which this case is a continuation-in-part. For such instances the present structures with a second or third slot of equal cross-section area added to the single slot 38, 2 or 22 often provides the most satisfactory flow meter construction.

FIGURE 3 illustrates also how a conventional manometer 13 may be connected to taps 10, 12 to measure the actual pressure drop. Advantageously, the manometer calibration may be made directly in terms of flow rate.

Allusion has already been made to how pressure taps 10, 12 are placed well inside the terminal ends of the slot 2. The same is true for intersection of taps 10, 12 with slot 38 and slot 22. In the lattermost instance, i.e. the mode of FIGURE 3, the pressure taps 10, 12 need intersect only one of the slots since the pressure drop in each slot is proportional to the total flow through the flow meter.

Experimentally and theoretically, it has been established that for laminar flow through a linear flow meter there is developed a non-linear pressure drop across the entrance, and across the exit of the flow channel or channels. This non-linear pressure drop is proportional to the product of the fluid density and the square of the volume flow rate and is of much greater magnitude for the entering than for the exiting fluid. In continuing downstream of the channel entrance, it will be found that after a distance equal to a specified number, namely 20 times the depth of the slot, the flow approaches a laminar distribution and remains so until an upstream distance from the exit equal to another factor times the depth of the slot, at which point the exit non-linearity is apparent. It has been found that if the pressure pipe or taps 10 and 12 are both disposed within the truly laminar flow region, the pressure drop across these taps is proportional to the mean volume flow rate between these taps to a very high degree of linearity. If the taps are both placed outside the flow channel or channels, as can well be done, the channel or channels must, however, be made relatively long in order to have the linear pressure drop portion swamp out the effect of the non-linearities at the ends thereof. This is usually not practical for commercial work in which the shortest and most compact design as well as the minimum pressure drop is desired.

However, since the exit non-linearity is fortunately, but a small factor compared to the entrance non-linearity, it is possible, should the occasion demand, to place the downstream tap outside of the flow channel or channels and still maintain relatively good overall linearity in a compact flow meter. Accordingly, the instant invention also contemplates placement of the upstream tap within a flow channel and the downstream tap outside of a channel.

As has been indicated the individual channel 2, 38, 20, etc. should be properly dimensioned and proportioned as a wide unimpeded slot of a substantially uniform depth. Thus "$d$," the depth, should be in the range of 0.002–0.100 inch. Smaller depths than 0.002 allow dust particles to clog the channel passageway, while larger depths than 0.100 have so little restriction as to be worthless for producing a pressure drop. Similarly the $w/d$ ratio should exceed 10 to 1. The arcuate nature of the individual slots 2, 20, 22, 24 in the modes of FIGURES 2 and 3 does not alter the geometrical $w/d$ relationship in the slot, since a completely annular slot would have a "$w$" equal to the circular circumference and a "$d$" equal to the annular distance between tubes. Therefore, the nature of the annular segments, formed by the cross-sectional shape of slots 2, 20, 22, 24 is the same as that of truly rectangular slot 38 and they too can be considered as being of generally rectangular shape.

The flattened rectangular or annular segment form of the slot is of critical importance. This particular shape is demonstratably fifty percent more efficient than a comparable circular shape, and over three times as efficient as a comparable equilateral triangle shape. Thus, the well known equations for steady state laminar flow are:

$$(1) \qquad \frac{dp}{dl} = \frac{\gamma}{m}\left(\frac{1}{2}\rho v_m^2\right)$$

where $\gamma$ is a non-dimensional resistance coefficient, $\rho$ is the density of the fluid, $v_m$ is the mean velocity in the channel, and $m$ is the hydraulic radius defined as $$(2) \qquad m = \frac{\text{Channel area}}{\text{Channel perimeter}} = \frac{A}{L}$$

Experimentally, it has been found that flow through the channel may be characterized by the non-dimensional parameter known as the Reynold's number where $$(3) \qquad R = \frac{4m\rho v_m}{\mu}$$

where $\mu$ is the fluid viscosity; the Reynolds' number expresses the ratio of the inertia forces to the viscous forces in the fluid. For low values of R, the viscous forces predominate and the flow is laminar while for high values of R the inertia forces predominate and the flow is turbulent. The resistance coefficient is found to be a function of the Reynolds' number. Thus in flow through a circular channel for $R<2100$ the flow is laminar, while for $R>2100$ it tends to a turbulent flow. The transition occurs at $R=2100$, and it is interesting to note that this transition also occurs in the range: $R=1600$ to 2800 for channels of annular, rectangular and square cross sections.

In any of these cases the resistance coefficient $\gamma$, over the laminar flow range, can be shown to be given by $$(4) \qquad \gamma = \frac{C}{R}$$

where C is a constant. Upon combining Equations 1, 2, 3 and 4, there is obtained for laminar flow $$(5) \qquad \frac{dp}{dl} = \left(\frac{CL^2}{8A^2}\right)\mu v_m = K_1 \mu v_m$$

This is the fundamental equation which expresses the linearity of the pressure gradient with the volumetric flow in the channel.

From the foregoing Equations 1–5, the optimum slot can be determined among the following cases:
I. Cylinder of radius $a$
II. Annulus of inside radius $b$ and outside radius $a$
III. Thin annulus of outside radius $a$ and thickness $t$ where $t \ll a$
IV. Thin rectangular slot of thickness $t$ and width $w$ where $t \ll w$
V. Equilateral triangle of side length $a$ The following table compares the K factor, the Reynolds' number for each of the above slot configurations, and the pressure drop $dp/dl$ under specific conditions set below:

| Case No. | $K_1$ | $R$ | $dp/dl$ |
|---|---|---|---|
| I* | $\dfrac{8}{a^2}$ | $\dfrac{2\rho a v_m}{\mu}$ | $\dfrac{32\rho^2 v_m^3}{\mu R_I^2}$ |
| II* | $\dfrac{8}{a^2+b^2+\dfrac{(a^2-b^2)}{\log\dfrac{b}{a}}}$ | $\dfrac{2\rho(a-b)v_m}{\mu}$ | |
| III* | $\dfrac{12}{t^2}$ | $\dfrac{2\rho t v_m}{\mu}$ | $\dfrac{48\rho^2 v_m^3}{\mu R_{III}^2}$ |
| IV* | $\dfrac{12}{t^2}$ | $\dfrac{2\rho t v_m}{\mu}$ | $\dfrac{48\rho^2 v_m^3}{\mu R_{IV}^2}$ |
| V** | $\dfrac{40}{a^2}$ | $\dfrac{\rho a v_m}{\sqrt{3}\mu}$ | $\dfrac{48\rho^2 v_m^3}{\mu R_V^2}$ |

\* Hydrodynamics, 6th Ed. by Lamb, Dover Pub., New York, pp. 582, 585, 587.
\*\* Theoretical Hydrodynamics by Milne-Thompson, MacMillan & Co., Ltd., London, pp. 249, 517.

Since the mean velocity $v_m$ is numerically equal to the volumetric flow per unit area, assigning the same velocity value to each flow channel permits a direct comparison of efficiency between the different channels. Solving the expression of R, the Reynolds' number, for the geometric parameters $a, t, b$, permits the elimination of these parameters from the expression for $K_1$ in the table. The table listing for the value $dp/dl$ is therefore a direct comparison of the relative efficiency of the slot configurations. It is clear therefore that the thin annular slot and the thin rectangular slot are each 1½ times as efficient as the cylinder and about 3½ times as efficient as the equilateral triangle and are therefore to be preferred for laminar flow fluid flow meters.

While I have shown and described certain specific embodiments of the present invention, it will be readily understood by those skilled in the art that I do not wish to be limited exactly thereto, since various modifications may be made without departing from the scope of the invention as defined in the appended claims.

What is claimed is:

1. A fluid restrictor for linear flow meters comprising an elongated flow element having a fluid entranceway and a fluid exit passage at the ends thereof, a pair of spaced apart pressure taps positioned on said flow element intermediate the ends thereof adapted for connection to an indicating instrument, solid imperforate material intermediate said pressure taps blocking fluid flow through the flow element, and a substantially unimpeded fluid flow restricting channel inside said flow element extending through said imperforate material and connected to the taps, said channel exhibiting in cross-section a generally rectangular shape, said rectangular shape having substantially uniform channel depth ranging from 0.002–0.100 inch and a width at least ten times the depth, the upstream pressure tap being positioned to communicate with said channel at a location downstream of the fluid entrance thereto.

2. The fluid restrictor of claim 1 wherein said flow elongated flow element further comprises a pair of smooth surfaced plates secured in face-to-face contact, said plates constituting the said imperforate material, and a single flow channel therethrough is provided by an elongated shallow slot in the face of one plate.

3. A fluid restrictor for linear flow meters comprising an elongated flow element having a fluid entranceway and a fluid exit passage at the ends thereof, a pair of spaced apart pressure taps positioned on said flow element intermediate the ends thereof adapted for connection to an indicating instrument, each tap being in communication with a hereinafter described fluid flow restricting channel, solid imperforate material intermediate said pressure taps blocking fluid flow through the flow element and at least one substantially unimpeded fluid flow restricting channel inside said flow element extending through said imperforate material, said channel exhibiting in cross-section a generally rectangular shape, said rectangular shape having substantially uniform channel depth ranging from 0.002–0.100 inch and a width at least ten times the depth, the upstream tap communicating with a channel at a location downstream of the fluid entrance thereto equal to at least 20 times the average channel depth.

4. The fluid restrictor of claim 3 wherein said flow elongated flow element further comprises a pair of smooth surfaced plates secured in face-to-face contact, said plates constituting the said imperforate material and a single flow channel therethrough is provided by an elongated shallow slot in the face of one plate.

References Cited by the Examiner
UNITED STATES PATENTS

| | | | |
|---|---|---|---|
| 1,381,139 | 6/1921 | Smoot | 73—211 |
| 1,487,989 | 3/1924 | Vose | 73—205 |
| 1,884,896 | 10/1932 | Smith | 73—23 |
| 2,364,602 | 12/1944 | Comer et al. | 138—40 |

RICHARD C. QUEISSER, *Primary Examiner.*